United States Patent
Wacker

(10) Patent No.: US 8,224,466 B2
(45) Date of Patent: Jul. 17, 2012

(54) LOW-COST CONTROLLER HAVING A DYNAMICALLY CHANGEABLE INTERFACE

(75) Inventor: Paul C. Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 997 days.

(21) Appl. No.: 11/564,797

(22) Filed: Nov. 29, 2006

(65) Prior Publication Data

US 2008/0125914 A1    May 29, 2008

(51) Int. Cl.
*G05B 19/18* (2006.01)

(52) U.S. Cl. ............... 700/2; 700/3; 700/276; 370/428; 365/185.32; 707/824

(58) Field of Classification Search .......... 700/2, 5, 700/9, 18, 276; 709/201, 229; 365/185.33, 365/185.32; 707/824
See application file for complete search history.

(56) References Cited

U.S. PATENT DOCUMENTS

| | | | |
|---|---|---|---|
| 6,272,400 B1 | 8/2001 | Jankins et al. | |
| 6,330,806 B1* | 12/2001 | Beaverson et al. | 62/201 |
| 2002/0091844 A1 | 7/2002 | Craft et al. | |
| 2003/0061344 A1* | 3/2003 | Monroe | 709/224 |
| 2003/0065707 A1* | 4/2003 | Gagner et al. | 709/201 |
| 2005/0144173 A1* | 6/2005 | Yamamoto et al. | 707/10 |
| 2006/0159007 A1 | 7/2006 | Frutiger et al. | |
| 2006/0209868 A1* | 9/2006 | Callaghan | 370/428 |
| 2007/0055759 A1* | 3/2007 | McCoy et al. | 709/223 |

OTHER PUBLICATIONS

Echelon, "ShortStack Developer's Kit Model 23400," 3 pages, 2002.
Echelon, "ShortStack Overview," 12 pages, prior to Nov. 29, 2006.
Echelon, "Echelon ShortStack Micro Server Answers to Frequently Asked Questions," pp. 1-5, Apr. 2002.
Echelon, "ShortStack User's Guide," 152 pages, Mar. 2002.
"Introduction to the Lonworks System," Echelon Corporation, Palo Alto, CA pp. 3-7-3-8, 1999.

* cited by examiner

*Primary Examiner* — Kakali Chaki
*Assistant Examiner* — Sheela S Rao
(74) *Attorney, Agent, or Firm* — Seager Tufte Wickham LLC

(57) ABSTRACT

A controller for dynamic redefinition of a short stack initialization to provide a low cost generic controller. The controller may be built with a network variable interface which has its variables initially selected by the time of the completion of the build. Thus, if different network variables are desired, then the controller needs to be placed with the builder or special technician for implementing the changes. The present invention modifies that controller so as to provide a capability of changing the network variables without the need of the builder or anyone else to modify the network variables in the controller's interface. The network variables may now be changed by an operator or customer, even while that controller is in operation.

16 Claims, 2 Drawing Sheets

LOW-COST CONTROLLER HAVING A DYNAMICALLY CHANGEABLE INTERFACE

BACKGROUND

The invention pertains to controllers and particularly to network interfaces of controllers. More particularly, the invention pertains to network variables for the interfaces.

SUMMARY

The invention is an approach for dynamic redefinition of a short-stack initialization file to provide a low cost generic controller.

DESCRIPTION

There appears to be a significant need for networked HVAC zone controllers to be programmable so that a control sequence can be customized to meet the particular requirements specified for certain commercial building operations. Along with changing the control logic, the network interface also needs to be changed in order to communicate the new point data that was created. One of the major "open" protocols for commercial building integration is LonTalk™ defined by the Echelon Corporation and supported by one or more microprocessors called "Neurons™" that have a built-in LonTalk™ protocol stack and an application engine that can be programmed in the "Neuron™ C" language. Currently, the standard method that is provided by Echelon to allow the network image to be changed is the creation of "changeable" network variables (NV's) which requires much overhead and therefore is limited as a strategy for low cost zone controllers. Echelon provides an application called "ShortStack™" which runs on a Neuron™ that allows it to act as a LonTalk™ protocol driver for a separate application microprocessor. Since the application capabilities of the Neuron™ are significantly less than other cheaper microprocessors, one may utilize a ShortStack™ on the Neuron™ as a separate slave communication processor and put the application in a separate microprocessor. Echelon provides a tool that creates an initialization file based on the desired network interface for the other microprocessor to set up the ShortStack™ for proper operation. This procedure is meant to be performed once at the creation of the ShortStack™ application.

The present invention may provide users with a tool that will allow them to not only create custom application logic for the zone controller but also allow creation of new network variables (network image) to communicate desired information efficiently. This may be done by recreating a new custom short stack initialization file and sending it over LonTalk™ through the current ShortStack™ to the application processor. The initialization file section which allows for basic file sending, may remain the same while other parts that describe the application specific network variables are changed. The application processor may then do a reset of the Neuron™ and cause a re-initialization on the fly to bring up the Neuron™ with the new network interface from the downloaded file.

ShortStack™, Neuron™ and LonTalk™ may be regarded herein as trademarks of and refer to items by Echelon Corporation. Such items may used in one or more illustrative examples of the present invention. The terms "short stack" or "stack", "neuron" or "processor", and "lon talk" or "protocol", which may be used in this description to indicate items or elements of the invention, can refer to or include ShortStack™, Neuron™ and LonTalk™, respectively. However, short stack, neuron and lon talk items or elements noted herein may be substituted with equivalent other items or elements.

Figure 1:
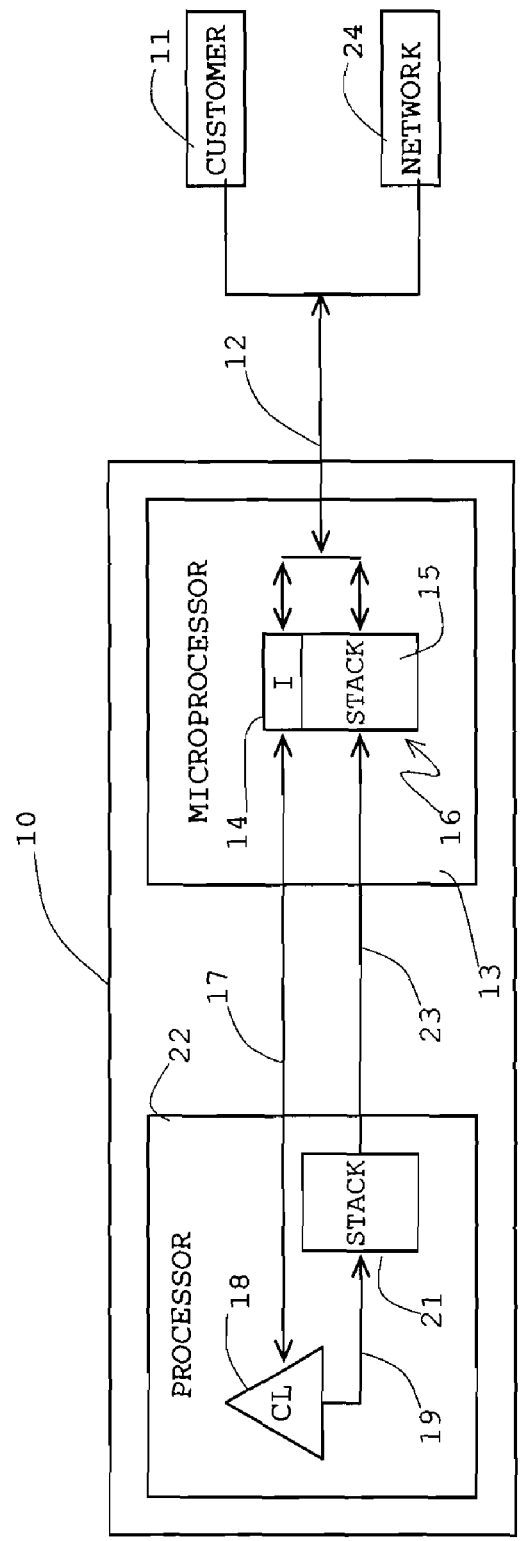
FIG. 1 is a diagram of a low-cost controller having a dynamically changeable network interface.

FIG. 1 illustrates an application of the present invention with an illustrative a system 10. System 10, for example, may be an HVAC zone controller; however, just the basic elements of the presentation are shown. System 10 could be some other kind of controller.

A customer 11 may send signals to a microprocessor 13 which contains an interface 14 (I) having network variables needed for communication by the customer 11 or network 24 with the system 10 via a line 12. These variables may be situated in a portion 14 of a short stack (stack, memory) 16. These variables are not intended to be changed. Also, signals may be sent to a portion 15 of the short stack 16 via line 12 by the customer 11 or network 24 to utilize network variables in the short stack 16. These network variables may be used in conjunction, for instance, with sensing certain parameters. The network variables may be entered into the short stack 16 at the time of design and fabrication of the system 10. The network variables are chosen by the designer of system 10. These network variables are meant to stay as they are in the device when the customer 11 uses it in the field. The present system 10 may circumvent that issue of non-changeability of the network variables in portion 15 of the short stack 16.

Signals from the customer 11 or network 24 may travel via the line 12, interface 14 and line 17 to a control logic (CL) module 18 of a microprocessor 22. Processor 22 may be a higher end processor than processor 13. The control logic module 18 may be connected to a short stack (stack, memory) 21 via a line 19. Signals to module 18, ultimately from the customer 11 or network 24, may provide a basis for developing a set of network variables different from the set of network variables in the short stack 16 portion 15. The different set of variables may be those later preferred by the customer 11 at that moment. The set of network variables initially in the short stack 16 portion 15 may be regarded as a first set, and the different set of network variables may be regarded as a second set for purposes of this description.

The second set of network variables may be impressed or flashed into the short stack 21 by module 18 via the line 19. Then this set of variables may be provided via line 23 to short stack portion 15 by reflashing the portion 15 memory with the second set to replace the first set of network variables. As noted herein, the original or first set of network variables may be chosen at about the time that the product was made. These variables may be regarded as initially selectable by a customer 11 if the latter was available at that time. However, when the stack 15 of this product is initially flashed with these network variables, the selection of variables is made to stay the same during and after the product is released into the field. It can be noted that the customer 11 might not always need all of the variables in the stack 15 when the device is in the field since the customer's needs may change from time to time. The customer may want variables that were not entered at the time of the product assembly and initialization of the stack 15 of short stack 16.

The system 10 of present invention may fulfill these desires and/or needs of the customer 11. It permits the customer 11 to change the set of network variables in the short stack 16, virtually at any time, even in the field. The network variables may be changed on the fly, that is, while the system 10 is operating. While a change of variables is being effected, that is, when the short stack portion 15 being reflashed or reinitialized by processor 22; there may be a temporary and very short suspension of normal communication and/or processing activity between system 10 and the customer 11 or network 24. This period of time may be so short in that it amounts merely to a glitch which is not necessarily disruptive of normal operation of system 10.

A change of network variables may be extensive involving many or all of the variables or it may be small perhaps involving only one variable, for example, effectively a replacing a temperature variable with a pressure variable. However, such a change may involve all of the variables being replaced, but with many of the same ones, due a complete reflashing of the short stack portion 15 with the contents of short stack 21.

Equivalent components may be implemented to replace ShortStacks™ 16 and 21, Neuron™ microprocessor 13 and the LonTalk™ protocol. In view of the inconvenience of a protocol development, the Echelon items along with their established protocol and compatible products may permit the present system controller 10 to provide convenience and advantages not known before If there were actually an obviousness in implementing the present invention, it should have been implemented and became well known by others some time ago because of its superb advantages of providing a key to the flexibility of dynamically changing network variables on the fly by a customer in the field, and yet being an inexpensive approach and system.

Figure 2:
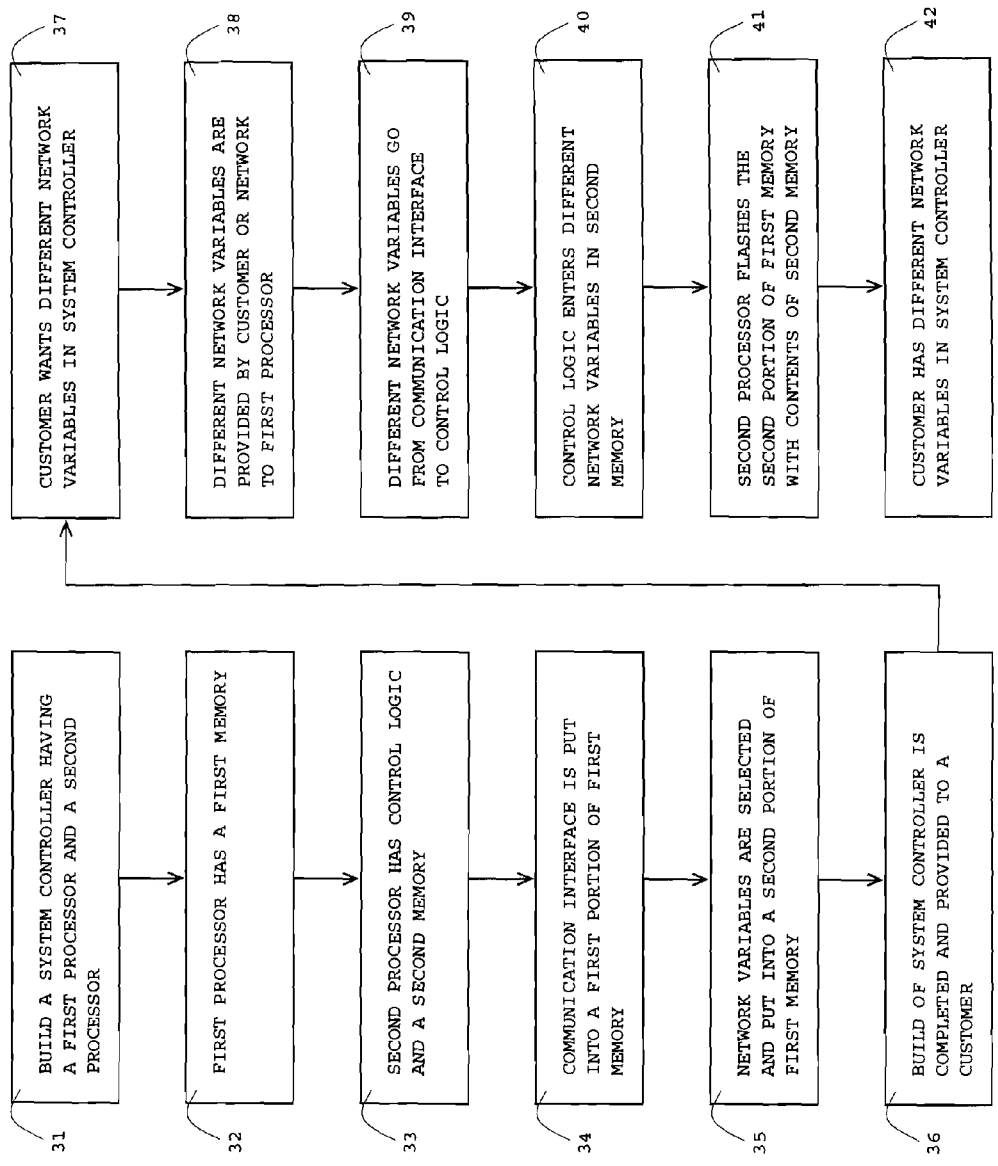
FIG. 2 is a sequence diagram of a dynamically changing of the network interface.

FIG. 2 is a diagram of a sequence of blocks showing an illustrative example of an approach for dynamically changing a network variable interface of the system controller 10. Block 31 is a building of the system controller 10 having a first processor 13 and a second processor 22. Block 32 indicates that the first processor 13 has a first memory 16. Block 33 indicates that the second processor 22 has control logic 18 and a second memory 21. Block 34 shows that a communication interface is put into a first portion 14 of the first memory 16. Block 35 indicates network variables being selected and put into a second portion 15 of the memory 16. Block 36 indicates a completion of building the system controller 10 and a providing of the controller 10 to a customer 11.

Block 37 indicates a situation where the customer 11 wants network variables different than those in the system controller 10 at the time of delivery to the customer. Normally with such controller, it would be sent back to the provider or manufacturer for reprogramming of the network variables interface. However, a block 38 shows the customer 11 or network 24 beginning the present approach realized by the system 10 by providing the different network variables to the first processor 13. Block 39 indicates the different network variables going from the communication interface of portion 14 of memory 16 to a control logic module 18 of the processor 22. Block 40 shows that the control logic 18 may appropriately enter the different network variables into the memory 21. Block 41 indicates that the processor 22 may flash the second portion 15 of memory 16 with the contents (i.e., different network variables) of the memory 21. Block 42 notes that the customer 11 then has different network variables in the system controller 10. The latter may be effected without the customer having to return the controller 10 to the manufacturer or provider.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A single HVAC zone controller for dynamic redefinition of a short stack initialization-comprising:
   a first processor connected to a network; and
   a second processor connected to the first processor, wherein the second processor is connected to the network via the first processor; and
   wherein:
   the first processor comprises:
   a communication interface; and
   a first network variable memory having a first set of network variables; and
   the second processor comprises:
   a control logic module connected to the communication interface;
   a second network variable memory connected to the control logic module and the first network variable memory; and
   the communication interface provides a second set of network variables to the control logic module;
   the control logic module provides the second set of network variables to the second memory; and
   the second memory has contents flashed into the first memory such that the second set of network variables replaces the first set of network variables.

2. The controller of claim 1, wherein the first set of network variables is provided by a customer to the first processor.

3. The controller of claim 1, wherein the first and second processors are microprocessors.

4. The controller of claim 1, wherein the network variables in the communication interface are not to be changed.

5. The controller of claim 1, wherein a customer may change the first set of network variables while the controller is operating.

6. A method for making a controller having changeable network variables, comprising:
   building a controller comprising a first processor and a second processor;
   providing a first memory to the first processor for storing network variables; and
   providing control logic and a second memory to the second processor; and
   providing a communication interface in a first portion of the first memory; and
   wherein contents of the second memory can be flashed into the first memory to change the network variables.

7. The method of claim 6, further comprising:
   selecting and providing a first set of network variables to a second portion of the first memory; and
   completing a build of the controller.

8. The method of claim 7, further comprising:
   providing the controller to a customer; and
   wherein:
   the customer prefers a second set of network variables to be in the controller; and
   the customer provides the second set of network variables to the communication interface.

9. The method of claim 8, further comprising:
   moving the second set of network variables from the communication interface to the control logic;

placing the second set of network variables from the control logic to the second memory; and flashing the first memory with the second set of network variables from the second memory.

10. The method of claim 9, wherein:

the customer has the second set of network variables in the controller; and the second set of network variables were put into the controller while the controller is operating.

11. The method of claim 10, wherein the controller is an HVAC controller.

12. A system for changing parameters in a controller, comprising:

a first memory in a first processor;

a control logic in a second processor;

a second memory in the second processor; and wherein:

the system is a networked HVAC zone controller;

the first memory is flashed with an initial set of selected network variables;

the control logic receives another set of selected network variables different than the initial set of selected network variables;

the control logic flashes the second memory with the other set of selected network variables;

the first memory is reflashed with contents of the second memory; and the first memory contains the other set of selected network variables in lieu of the initial set of selected network variables.

13. The system of claim 12, wherein the initial set of selected network variables is replaced with the other set of network variables while the system is operating.

14. The system of claim 13, wherein the initial set of selected network variables is flashed into the first memory before completion of fabrication of the system for changing parameters.

15. The system of claim 14, wherein the other set of selected network variables are provided to the system, by a customer after completion of fabrication of the system, for changing network variables.

16. The system of claim 15, wherein the first processor comprises a communication interface for connection with an external network.

* * * * *